C. D., S. B. & H. H. KATTERHEINRICH & W. J. HINZE.
CREAM TESTER.
APPLICATION FILED NOV. 1, 1912.
1,084,886.
Patented Jan. 20, 1914.
3 SHEETS—SHEET 1.
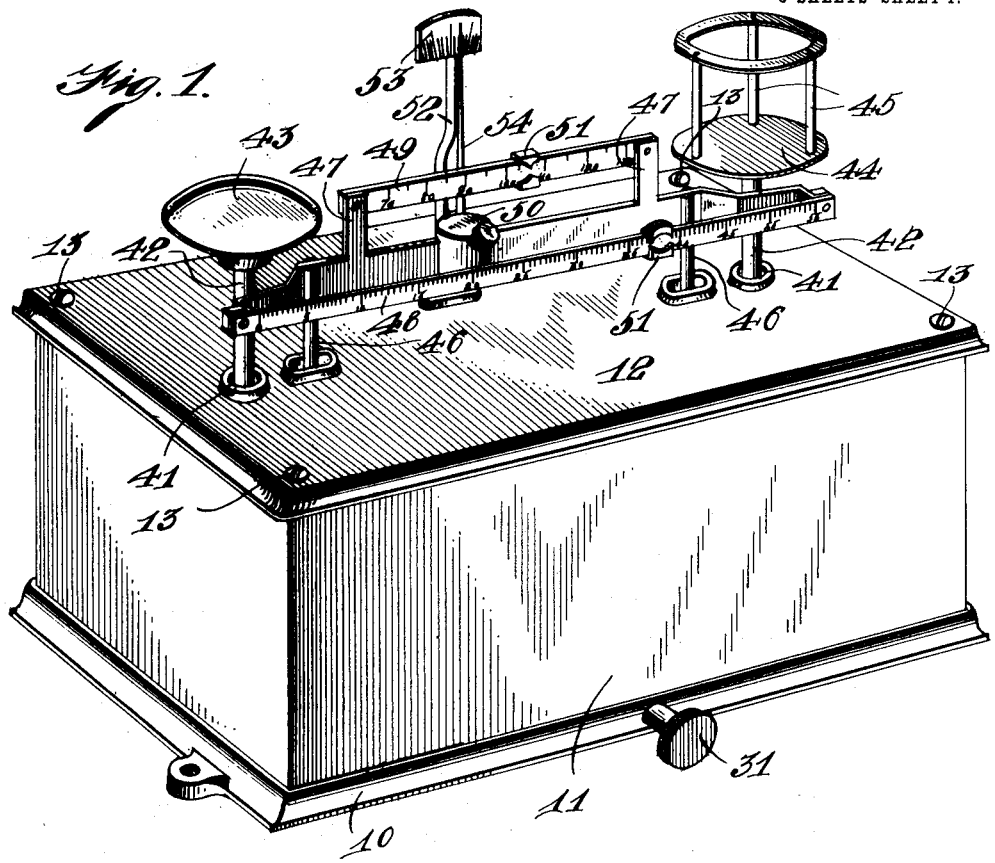
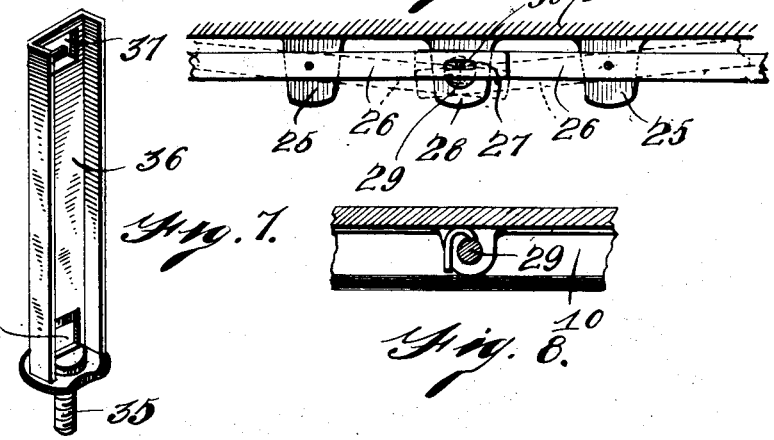
WITNESSES
INVENTORS
C. D. Katterheinrich, S. B. Katterheinrich,
H. H. Katterheinrich, and W. J. Hinze
By E. E. Vrooman, their Attorney.

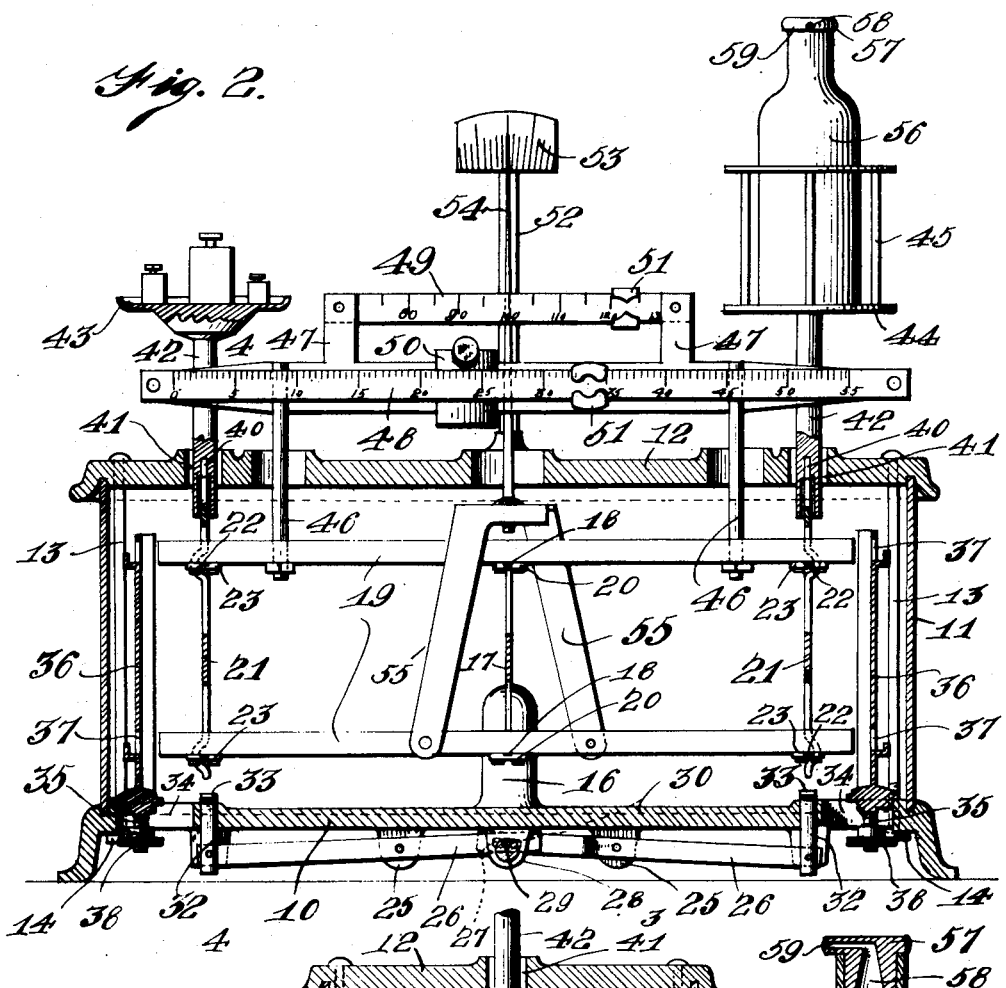

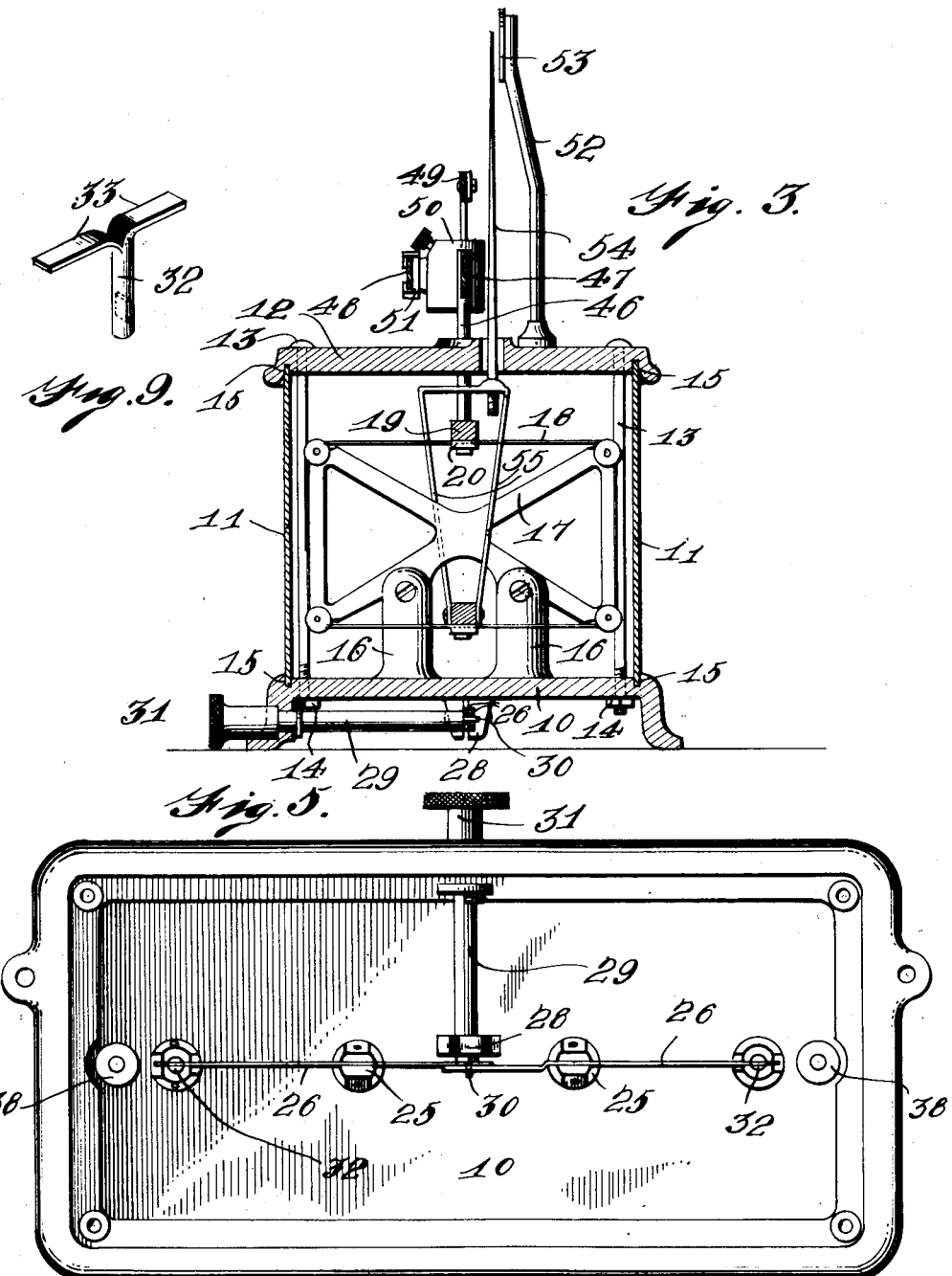

UNITED STATES PATENT OFFICE.

CHRISTY D. KATTERHEINRICH, SAMUEL B. KATTERHEINRICH, HERMAN H. KATTERHEINRICH, AND WILLIAM J. HINZE, OF NEW KNOXVILLE, OHIO.

CREAM-TESTER.

1,084,886.  Specification of Letters Patent.  Patented Jan. 20, 1914.

Application filed November 1, 1912. Serial No. 729,152.

*To all whom it may concern:*

Be it known that we, CHRISTY D. KATTERHEINRICH, SAMUEL B. KATTERHEINRICH, HERMAN H. KATTERHEINRICH, and WILLIAM J. HINZE, citizens of the United States, residing at New Knoxville, in the county of Auglaize and State of Ohio, have invented certain new and useful Improvements in Cream-Testers, of which the following is a specification, reference being had therein to the accompanying drawing.

This invention is a device having for its object the testing of either cream or milk to find the per cent. of butter-fat contained therein.

It is a well-known fact that the specific gravity and consequently weight per unit of bulk, varies both with the cream content and with the temperature of either milk or cream. Heretofore cream has been tested for the butter-fat content by bringing the same, either by cooling or warming, to a certain predetermined temperature, and then testing for the specific gravity by a hydrometer, or other like means.

The principal object of this invention is to provide an apparatus wherein cream may be tested at any temperature between 80 degrees F. and 140 degrees F., and without the loss of any cream and the butter-fat content accurately ascertained.

The device consists of certain parts, the construction, combination and arrangements of which, when properly assembled, form the tester which will determine the per cent. of butter-fat in either cream or milk.

The construction, combination and arrangement of the parts which make up the device are hereinafter more fully described and illustrated in the accompanying drawings, and the manner of using the cream tester, and the claims made for same are more fully set out and explained.

In the accompanying drawings, like characters of reference indicate like parts in the several views, and Figure 1 is a perspective view of the cream and milk tester, the view being taken from the exterior thereof. Fig. 2 is a vertical longitudinal section therethrough. Fig. 3 is a central transverse section through the device, certain of the parts being omitted to more clearly show the mechanism. Fig. 4 is a vertical section therethrough on the line 4—4, Fig. 2. Fig. 5 is a bottom plan view of the device. Fig. 6 is a detail of certain portions of the stop mechanism used herewith. Fig. 7 is a perspective view of a certain guide used in connection herewith. Fig. 8 is a perspective view of a pivot lug used herewith. Fig. 9 is a perspective of one of the stop members. Fig. 10 is a sectional view through the cream or milk bottle or holder used herewith.

In carrying out the objects of this invention, there is provided a base 10, upon which is located a casing 11 having a top 12. This base, casing and top are secured together by means of suitable screws 13, which pass through the top and base and have upon their lower ends nuts 14. In order to hold the casing in position, grooves 15 are provided in the top and base.

Rising from the base 10 are certain lugs 16, which serve to support a frame 17, which is surrounded by a flat wire 18. Resting on the upper and lower horizontal portions of this wire are bars 19, which are held tightly clipped to the wire by clips 20. At each end of these bars there is provided a frame 21, which is similarly surrounded by a wire 22 also secured firmly to the bars by clips 23. Each of the frames 21 is provided with downwardly extending members 24, and beneath the base 10 are certain lugs 25 whereto are pivoted levers 26, the ends of which overlap and are provided with slots 27.

Mounted in bearings 28 hanging from the bottom or base 10 is a rod 29, which is provided with a pin 30 extending through the slots 27. This pin is eccentric to the rod so that when the latter is turned by means of the knurled head 31, the overlapping ends of the levers will be depressed.

At the outer end of each lever 26 there is provided a plunger 32 carrying at its top diverging arms 33, which are so arranged that when the plunger is raised these arms will engage the projections 24 and prevent the bars from moving.

At each end of the base there is a slot 34 wherein is inserted the threaded stem 35 of a guide member 36 and this guide member has punched out portions 37 arranged to receive the ends of the bars 19 when the guide members are moved inward, thus forming a permanent lock for the device so that injury may be prevented during transportation. In order to hold these guide and stop members in position, the threaded stem 35 of each member is provided with a knurled nut 38 so that the member may be clamped firmly to the bottom when in adjusted position.

Each of the frames 21 is provided with an outwardly extending portion 39 having on its upper end a finger 40. These fingers 40 are alined with openings 41 in the top, and detachably engaged with said fingers are tubes 42, which carry on their upper ends platforms indicated at 43 and 44 respectively. The platform 44 has extending upward therefrom a cage 45.

Posts 46 project from upper bar 19 through the openings in the top 12 of casing 11 and carry a scale beam 47. The ends of the scale beam 47 are offset to provide angular flanges that are fastened to the ends of a cream scale 48 to hold said cream scale parallel with the beam 47. At intermediate points the beam 47 is provided with upright posts that support a temperature scale 49 above and parallel with said beam. A weight 50 is slidable on beam 47 and similar weights 51 are mounted on scales 48 and 49. A post 52 mounted on the top of casing 11 in the rear of the scale beam 47, extends well above said beam and carries a segmental scale 53. A pointer 54 mounted on a frame 55 carried by the lever bar 19 coöperates with the segmental scale 53.

Removably held in the cage 45 is a calibrated cream container 56, which is preferably made in the form of a bottle and of some light metal, as for instance aluminum. This cream container is provided with a stopper 57 having a recess 58 in the lower portion thereof and from this recess extends a passage 59.

In testing cream or milk for butterfat with this device, two bottles or containers, calibrated for quantity and weight are used one of these containers is filled with impoverished milk placed on platform 43 and the other is filled with the cream or milk to be tested, placed on platform 44, the same quantity being used in each of the bottles. Then by properly manipulating the weights, the percentage of butterfat in cream or milk may be determined. A calibrated weight is provided and may be substituted for the container and the impoverished milk in the container on platform 43.

There has thus been provided a simple and efficient device of the kind described, and for the purpose specified.

Having thus described the invention what is claimed, as new, is:—

1. In a cream tester, the combination with a balance, of a scale beam carried thereby and having off-set flanged ends, a cream scale carried by said flanged ends, posts carried by the beam, a temperature scale carried by the posts, a segmental scale, a pointer operated by the balance and coöperating with the segmental scale and weights carried by the beam, temperature, and cream scale.

2. In a cream tester the combination with a balance, of a scale beam carried thereby and having offset end portions terminating in flat flanges, a weight on said beam, a cream scale fastened to the end flanges and held in parallel relation to the beam by said flanges, a weight carried by the cream scale, a temperature scale carried by the beam, a segmental scale, and a pointer operated by the balance and coöperating with the segmental scale.

In testimony whereof we hereunto affix our signatures in presence of two witnesses.

CHRISTY D. KATTERHEINRICH.
SAMUEL B. KATTERHEINRICH.
HERMAN H. KATTERHEINRICH.
WILLIAM J. HINZE.

Witnesses:
 GEO. PIEHL,
 WILLIAM W. AUFDERHAAR.